United States Patent
Aingaran et al.

(10) Patent No.: US 9,600,412 B1
(45) Date of Patent: Mar. 21, 2017

(54) SECURE VIRTUAL ACCESS FOR REAL-TIME EMBEDDED DEVICES

(75) Inventors: Kathirgamar Aingaran, Newton, MA (US); Leslie D. Kohn, Saratoga, CA (US); Robert C. Kunz, Sunnyvale, CA (US); Jenn-Yuan Tsai, Cupertino, CA (US)

(73) Assignee: Ambarella, Inc., Santa Clara, CA (US)

( * ) Notice: Subject to any disclaimer, the term of this patent is extended or adjusted under 35 U.S.C. 154(b) by 902 days.

(21) Appl. No.: 13/008,287

(22) Filed: Jan. 18, 2011

(51) Int. Cl.
*G06F 12/00* (2006.01)
*G06F 13/00* (2006.01)
*G06F 13/28* (2006.01)
*G06F 12/02* (2006.01)
*G06F 12/10* (2016.01)

(52) U.S. Cl.
CPC .......... *G06F 12/0284* (2013.01); *G06F 12/10* (2013.01)

(58) Field of Classification Search
USPC .......................................... 711/111, 153, 151
See application file for complete search history.

(56) References Cited

U.S. PATENT DOCUMENTS

| 4,803,621 | A  | * | 2/1989  | Kelly ............................... 711/5 |
| 6,330,670 | B1 | * | 12/2001 | England et al. ................. 713/2 |
| 7,254,717 | B2 | * | 8/2007  | Karkkainen et al. ......... 713/193 |
| 2003/0200451 | A1 | * | 10/2003 | Evans et al. ................. 713/193 |
| 2009/0222816 | A1 | * | 9/2009  | Mansell et al. .................. 718/1 |
| 2010/0122197 | A1 | * | 5/2010  | Fujioka ......................... 715/769 |

* cited by examiner

*Primary Examiner* — Charles Rones
*Assistant Examiner* — Sidney Li
(74) *Attorney, Agent, or Firm* — Christopher P. Maiorana, PC

(57) ABSTRACT

An arbiter circuit and a translation circuit. The arbiter circuit may be configured to generate a first address signal in a virtual memory space by arbitrating among a plurality of clients to access a physical memory space. The clients may be classified as either privileged clients or non-privileged clients. The physical memory space may comprise at least one secure space. The secure space may be used to protect data of the privileged clients from being accessed by the non-privileged clients. The translation circuit may be configured to generate a second address signal by translating a page in the virtual memory space into the physical memory space. The page may correspond to a particular one of the clients that won the arbitration. The page may translate into the secure space if the particular client is one of the privileged clients. The page may also translate outside the secure space if the particular client is one of the non-privileged clients.

16 Claims, 4 Drawing Sheets

SECURE VIRTUAL ACCESS FOR REAL-TIME EMBEDDED DEVICES

CROSS REFERENCE TO RELATED APPLICATIONS

The present application may relate to co-pending application Ser. No. 12/725,899, filed Mar. 17, 2010, which is hereby incorporated by reference in their entirety.

FIELD OF THE INVENTION

The present invention relates to memory management generally and, more particularly, to a method and/or architecture for implementing secure virtual access for real-time embedded devices.

BACKGROUND OF THE INVENTION

Conventional mobile devices include a diverse collection of services in a single embedded system. These services may include cellular phone calling, general-purpose processing, audio and video encoding and decoding, 3-D graphics, Wi-Fi and Internet access, and/or GPS tracking. Future mobile device manufactures will likely add more features to extend offered services and remain competitive.

Certain services may need protection from unauthorized access, either from another component of the system or from external debugging access (i.e., JTAG). This protection is especially important for audio and video devices that operate on data protected by digital rights management (DRM). Authorized components in the chip decrypt data internally for processing or playback, but the system must hide this decrypted data from other components lacking DRM protection.

Mobile applications are written by a variety of sources (e.g., open-source hobbyists to professional software development companies) and are frequently executed on a single device. Invariably, some applications are vulnerable to hijacking by third-parties.

It would be desirable to implement an application to share one or more ATT mapping tables with hijacked clients, but prevent hijacked clients from extending control into a privileged area by preventing hijacking of the ATT tables.

SUMMARY OF THE INVENTION

The present invention concerns an arbiter circuit and a translation circuit. The arbiter circuit may be configured to generate a first address signal in a virtual memory space by arbitrating among a plurality of clients to access a physical memory space. The clients may be classified as either privileged clients or non-privileged clients. The physical memory space may comprise at least one secure space. The secure space may be used to protect data of the privileged clients from being accessed by the non-privileged clients. The translation circuit may be configured to generate a second address signal by translating a page in the virtual memory space into the physical memory space. The page may correspond to a particular one of the clients that won the arbitration. The page may translate into the secure space if the particular client is one of the privileged clients. The page may also translate outside the secure space if the particular client is one of the non-privileged clients.

The objects, features and advantages of the present invention include providing secure virtual access for real-time embedded devices that may (i) provide a single implementation that works well for general-purpose and real-time applications, (ii) focus on protecting a small set of critical applications that demand strict security, such as digital rights management, i) allow all clients to leverage the benefit of the ATT to meet real-time deadlines independent of privilege, (iv) provide hardware used to implement the ATT using a minimum size where the chip may be reused in applications that are exclusively privileged, and/or (v) provide a system that may execute diverse third-party applications without increasing the risk of exposure to revealing secure content thus making the device more adaptable and versatile.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention relates generally to a system-on-a-chip with a collection of host processors managing a collection of embedded devices, including specialized functional units, co-processors and/or input/output units. Some devices may need to implement protection from accessing and/or tampering from other devices in the system to provide compliance with digital rights management (DRM) protocols. The techniques and/or implementations described in the present invention may allow one or more host processors to prevent non-secure devices from accessing and/or tampering with decrypted data protected by DRM or other security protocols. The present invention may also protect entries in an ATT from unauthorized access in a system where privileged and non-privileged clients use the same ATT table. This technique may prevent non-privileged clients from changing privileged entries.

Copyright holders use Digital Rights Management (DRM) techniques to prevent unauthorized copying of data that they distribute to authorized purchasers of intellectual property. An example of DRM is a record company charging by the song or the album. Without DRM, a single user could potentially buy a single digital copy of the unencrypted content from the record company, then redistribute the song to anyone, thus limiting sales of the musical content. DRM defeats such unauthorized distribution by allowing free distribution of the encrypted content. Only authorized agents (e.g., privileged clients) are permitted to decrypt content after verifying purchase of the intellectual property.

In a DRM implementation, copyrighted material and licensed programs should remain protected from the user and be accessible through a secure interface. Otherwise, a user can freely distribute decrypted content or gain access to unlicensed features of an embedded product (e.g., jail-breaking in a cellular device). At the same time, embedded devices also operate on decrypted data to properly process such data. For example, only a decrypted song can be played on an audio playback device (e.g., a speaker, portable music player, etc.). Thus, embedded devices normally limit visibility of DRM content to trusted portions of the system that follow proper security protocols. Such protection is especially useful in embedded systems where untrusted third-party programs are allowed to use the device.

Figure 1:
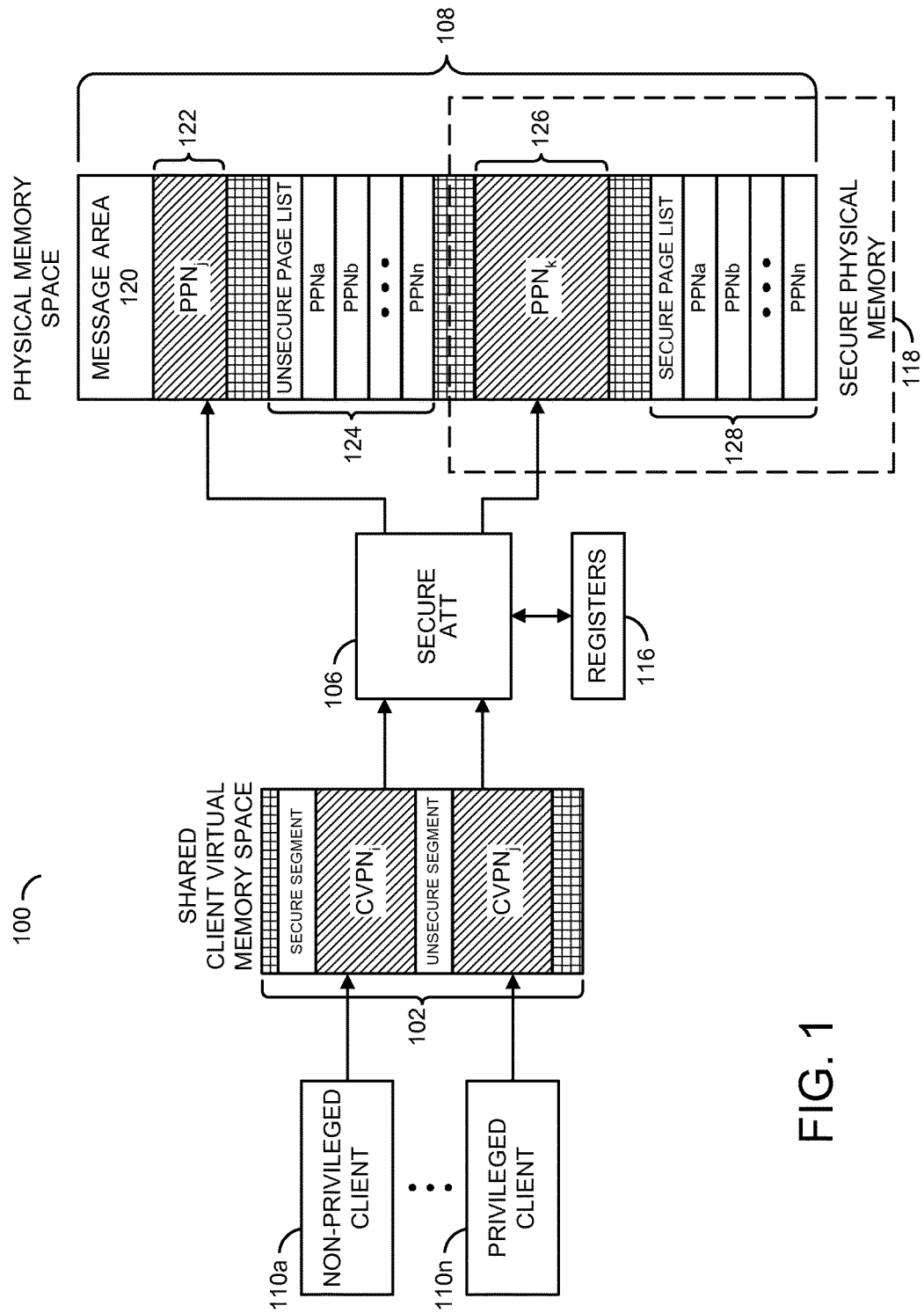
FIG. 1 is a diagram illustrating two clients accessing a memory with different security privileges.

Referring to FIG. 1, a diagram of a memory arrangement 100 is shown. The arrangement 100 generally comprises a block (or circuit) 102, a block (or circuit) 106 and a block (or circuit) 108. The circuit 102 may be implemented as a memory. The circuit 106 may be implemented as a secure address translation table (ATT). The circuit 108 may be implemented as a memory. The memory 106 may be implemented as a shared client virtual memory space. The memory 108 may be implemented as a physical memory space. The address translation table 106 may be implemented in hardware, software, or a combination of hardware and/or software. A number of blocks (or circuits) 110a-110n may access the memory 102. The circuits 110a-110n may represent a combination of one or more privileged clients and/or one or more non-privileged clients. The block 110a is shown as a non-privileged client. The block 110n is shown as a privileged client. The secure address translation table 106 may be located on a chip that maps the virtual pages of the clients 110a-110n to physical pages in the address translation table 106. The individual clients 110a-110n may index the address translation table 106 with a virtual page number (CVPN) of a particular client to find the corresponding physical page number (PPN) of the physical memory space 108. The physical memory space 108 generally comprises a secure physical memory space 118, a message area 120, a PPN area 122 and an unsecure page list 124. The secure physical memory space 118 generally comprises a PPN area 126 and a secure page list 128.

One of the clients 110a-110n may be implemented as a security processor (e.g., the privileged client 110n). Communication between the security processor 110n and the other clients 110a-110n (to be described in more detail in connection with FIG. 2) may occur through point-to-point connections, messages through a proxy, sharing a message area 120 in physical storage visible to both the security processor and the clients 110a-110n, etc. Communication through the physical memory 108 may be implemented by one of the clients 110a-110n accessing the physical memory space 108 directly, through the ATT 106, or by mapping the message area 120 to a virtual page within a segment of the physical memory space 108. An example of such an implementation may be found in co-pending application Ser. No. 12/725,899, which is incorporated by reference in its entirety.

The memory arrangement 100 may include a number of registers 116. The registers 116 generally store a configuration state for client segments and the CVPN-to-PPN mappings. The registers 116 may be accessible in the physical address space. In one example, the registers 116 may be implemented as specialized control registers rather than general purpose registers found on a processor. The mapping may be a function of the content of the registers 116 and the secure address translation table 106.

The security processor 110n may create one or more regions of secure memory in the physical memory space 108 and allocate the physical pages of the client based on the access privilege of the client. The system 100 may implement secure regions of the memory 108 using a base and bound register, a privilege bit per page and/or a privilege bit per block of pages of fixed or variable size. The memory pages in the secure regions may be referred to as secure page lists 128 (or secure physical pages 128). The secure physical pages 328 may be addressed by secure PPNs. The non-privileged client 110a may allocate and manage non secure memory for other clients. Similarly, the privileged client 110n may allocate and manage secure memory area or unsecure memory area for another client or for the privileged client 110n.

The security processor 110n may create one or more regions of memory in the ATT memory space and allocate each ATT segment of the particular one of the client 110a-110n. The ATT memory space for each of the clients 110a-110n is generally based on an access privilege defined for each of the clients 110a-110n. The system 100 may implement secure regions of memory using a base and bound register, a privilege bit per page and/or a privilege bit per block of pages of fixed or variable size. The ATT entries corresponding to the pages in secure regions are generally referred to as secure ATT entries or secure virtual pages and are indexed by secure CVPNs.

When one of the non-privileged clients 110a requests access to the memory 108, the security processor in the client 110n may allocate all the ATT pages of the non-privileged client 110n and physical pages in a non-secure region of the memory 108. When one of the privileged clients 110n requests memory, the security processor may allocate all of the virtual pages of the privileged client 110n within the secure region of the ATT address space 106. The security processor on the privileged client 110n may allocate portions of the physical memory 108 based on the privileged status of a particular one of the clients 110a-110n. One of the privileged clients 110n may request non-secure physical memory access to share data with one of the non-privileged clients 110a. The privileged clients 110n may use secure CVPNs to access the non-secure physical memory. Memory allocation may be handled by one or more of the clients 110a-110n other than the security processor, but only privileged clients may allocate access to the secure portions 126. In general, for the privileged clients 110n to remain secure, computer code related to the privileged client 110n should remain in the secure memory space 118.

The non-privileged clients 110a cannot update an ATT entry in the secure ATT region regardless of the privileged state of the PPN of the update. If a non-privileged client 110a violates this condition, the system 100 may drop the request and generate a virtual security access violation exception to the host or to security processor on the privileged client 110n.

The present invention may allow a non-privileged client 110a to access and modify ATT entries of the non-privileged client 110a or the entries of another non-privileged client 110a. However, access to the entries of the privileged clients 110n by a non-privileged client 110a is blocked. A privileged client 110n may always update its own entries and access and modify ATT entries of any of the other clients 110a-110n in the system independent of privilege status of the other clients 110a-110n.

The privileged client 110n and the non-privileged client 110a may share a single virtual address space. The privileged client 110n may have secure privileges. The privileged client 110n and the non-privileged client 110a may access physical memory 108 through the ATT translation unit 106. However, only the privileged client 110n (or security processor) may access the protected region of virtual memory (e.g., the secure segment 128). In one example, the secure ATT 106 may check for valid privileged access twice. The first check occurs prior to translation to physical in the shared virtual memory space 102. The second check occurs after translation to physical memory 108.

Figure 2:
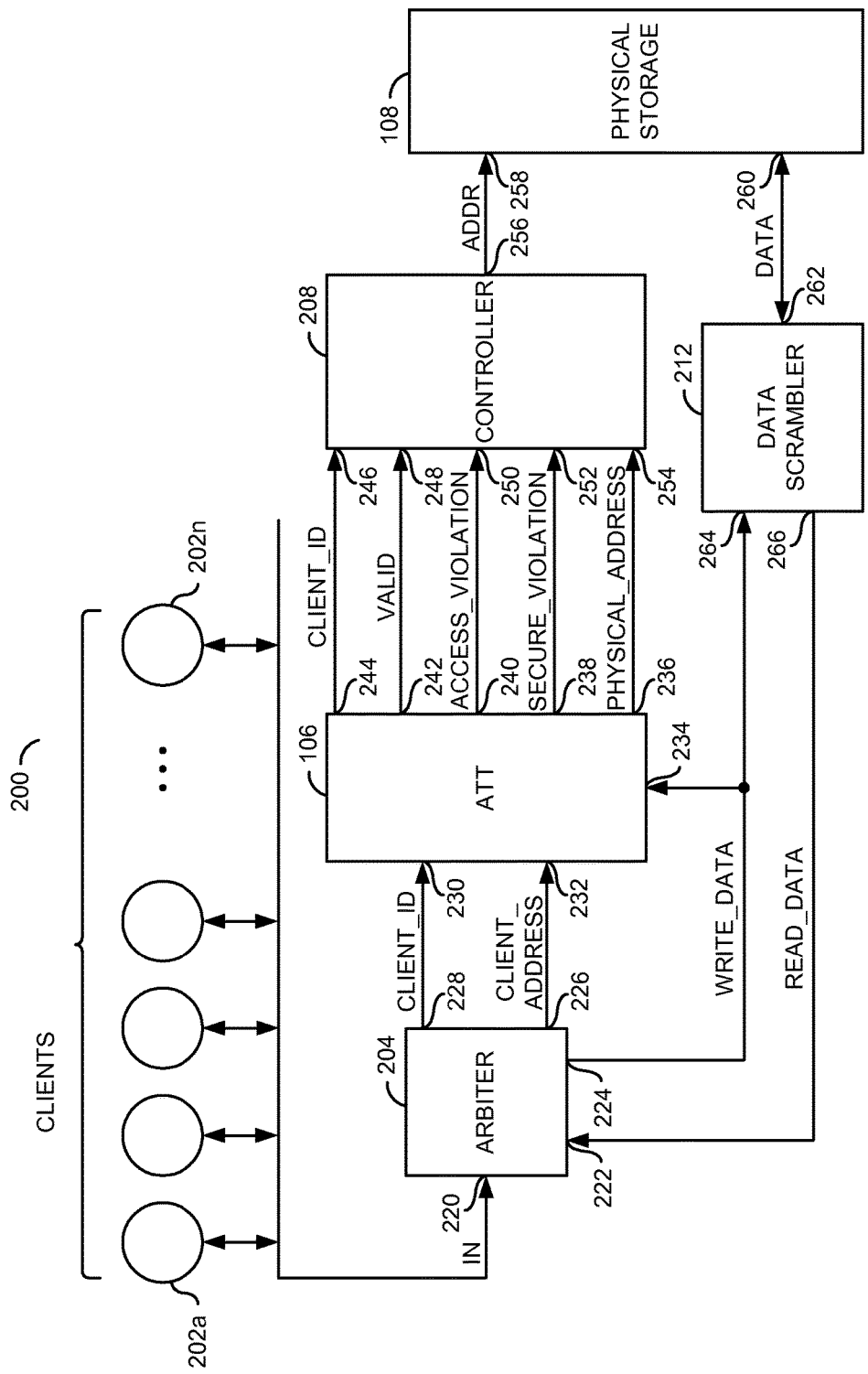
FIG. 2 is a diagram illustrating the placement of a secure ATT lookup table in a memory controller.

Referring to FIG. 2, a block diagram of a system 200 is shown in accordance with an embodiment of the present invention. The system 200 generally comprises the circuit 106, the circuit 108, a number of clients 202a-202n, a block (or circuit) 204, a block (or circuit) 208 and a block (or circuit) 212. One of the clients 202a-202n may be implemented as a security processor (e.g., the privileged client 202n). The circuit 204 may be implemented as an arbiter circuit. The circuit 106 may be implemented as an address translation table circuit. The circuit 208 may be implemented as a controller circuit. The circuit 108 may be implemented as a physical storage device. The circuit 212 may be implemented as a data scrambler circuit. The clients 202a-202n generally correspond to the clients 110a-110n of FIG. 1. The circuit 204 may have an input 220 that may receive a signal (e.g., IN), an input 222 that may receive a signal (e.g., READ_DATA), an output 224 that may present a signal (e.g., WRITE_DATA), an output 226 that may present a signal (e.g., CLIENT_ADDRESS), and an output 228 that may present a signal (e.g., CLIENT_ID).

The circuit 106 may have an input 230 that may receive the signal CLIENT_ID, an input 232 that may receive the signal CLIENT_ADDRESS, an input 234 that may receive the signal WRITE_DATA, an output 236 that may present a signal (e.g., PHYSICAL_ADDRESS), an output 238 that may present a signal (e.g., SECURE_VIOLATION), an output 240 that may present a signal (e.g., ACCESS_VIOLATION), an output 242 that may present a signal (e.g., VALID) and an output 244 that may present the signal CLIENT_ID.

The circuit 208 may have an input 246 that may receive the signal CLIENT_ID, an input 248 that may receive the signal VALID, an input 250 that may receive the signal ACCESS_VIOLATION, an input 252 that may receive the signal SECURE_VIOLATION, an input 254 that may receive the signal PHYSICAL_ADDRESS and an output 256 that may present a signal (e.g., ADDR). The circuit 210 may have an input 258 that may receive the signal ADDR and an input/output 260 that may receive/present a signal (e.g., DATA). The circuit 212 may have and input/output 262 that may receive/present the signal DATA, an input 264 that may receive the signal WRITE_DATA and an output 266 that may present the signal READ_DATA.

The system 200 illustrates how the memory arrangement 100 interfaces with other components in the controller 208 to access the memory 108. In one example, the memory 108 may be implemented on a separate chip than the ATT circuit 106, the arbiter 204, the controller circuit 208, the circuit 212, the clients 202a-202n, and the sending processor 202n. The clients 202a-202n may send a request for physical storage to the arbiter 204 using a virtual address. The arbiter 204 may then choose which request to schedule based on a predetermined scheduling scheme. The arbiter 204 may then send the signal CLIENT_ID and CLIENT_ADDRESS to the ATT circuit 106. The ATT circuit 106 may then construct the signal PHYSICAL_ADDRESS from this information and may mark the signal VALID as valid or invalid depending on the signal CLIENT_ADDRESS. The ATT circuit 102 may also present the signal ACCESS_VIOLATION and the signal SECURE_VIOLATION. The controller 208 may then send the signal ADDR to the physical storage 210, discard invalid requests and update an error status in the registers 116 accordingly. In one example, the translation may also occur before arbitration. In this case, the ATT 106 may be part of one or more of the clients 202a-202n. In such an implementation, the ATT 106 may be restricted to generating physical accesses when communicating with the arbiter 204 and/or controller 208. The clients 202a-202n are not generally restricted from using virtual memory internally. The controller 208 does not normally perform address translations.

The ATT circuit 106 may support both virtual and/or physical clients. Physical clients may access physical memory directly (e.g., without translation). Virtual clients may access an address translation table to translate the virtual page number (CVPN) of a particular client 202a-202n to a physical page number (PPN). Virtual client accesses may be guarded by a CVPN base and an upper bound. The ATT circuit 106 may mark any access above or below the bounds as invalid, signal the controller 208 to prevent the invalid access (either a read or a write) from accessing the physical memory 210, and/or send an interrupt to the processor 202n for error handling. The processor 202n may enable, disable, and/or ignore interrupts generated by segmentation and/or security violations. A segmentation violation may indicate an access is out of range. A security violation may indicate an access violated access privilege. In physical clients, the CVPN may be equal to the PPN.

In one example, the secure ATT 106 may reside within the memory controller 208 used to access the physical memory 108 (typically off-chip). One or more of the clients 202a-202n of any privilege (e.g., privileged or non-privileged) may contend for read and/or write access to the memory 108. The arbiter 204 may implement arbitration logic that may determine the order of requests to the memory 108 when two or more of the clients 202a-202n contend for access to the memory 108. The memory controller 208 may provide access by the secure ATT 106 for a particular one of the clients 202a-202n once the arbiter 204 grants the particular one of the clients 202a-202n access to memory 108. The secure ATT 106 may translate the virtual address to a physical address and return a valid bit if the request passes security and/or segmentation checks. If the memory request fails an access check, the memory controller 208 may drop the memory request and notify the requesting one of the clients 202a-202n via an interrupt (or other signal) that the access failed. If the memory request passes the access check, the memory controller 208 may send the request to a physical controller for direct access to the physical storage 210.

The secure ATT 106 generally prevents on-chip, non-privileged clients 202a-202n from accessing secure locations of the memory 108. However, the secure ATT 106 does not normally protect off-chip agents from reading and/or writing to the memory 108. An on-chip memory scrambler 212 may encrypt data stored out to the memory 108. The scrambler 212 may also decrypt data read from the memory to prevent off-chip adversaries from operating directly on secure data (e.g., subject to DRM). Without the scrambler 212, an adversary could potentially observe DRAM pins directly using a logic analyzer to read unencrypted secure data to bypass on-chip security protocols.

The memory 108 may be implemented as physical storage that may include a disk, a flash card, RAM (such as DRAM), remote memory across a network, or any other memory-mapped portion of physical address space, including the secure ATT configuration registers visible to the clients 202a-202n. A configuration of an ATT state may affect the virtual memory translations and is normally protected from non-privileged access to prohibit compromised clients 202a-202n from altering the secure ATT region and/or access secure memory 108.

In general, all physical addresses must pass a post-translation security check to ensure that access from a non-privileged one of the client 202a-202n cannot change mapping from the non-secure locations to point to secure mapping locations. The post-translation security check may be implemented in the controller 208 or in the ATT 106. The particular placement of the post-translation security check may be varied to meet the design criteria of a particular implementation. For example, a module (or circuit) may be implemented between the controller 208 and the ATT 106. The post-translation security check may be done after every physical address and/or when a non-privileged one of the client 202a-202n updates ATT entries. The physical secure region 128 may be implemented as a series of continuous segments in the physical memory 108 or on a per-page granularity (e.g., one security bit per physical page entry).

Figure 3:
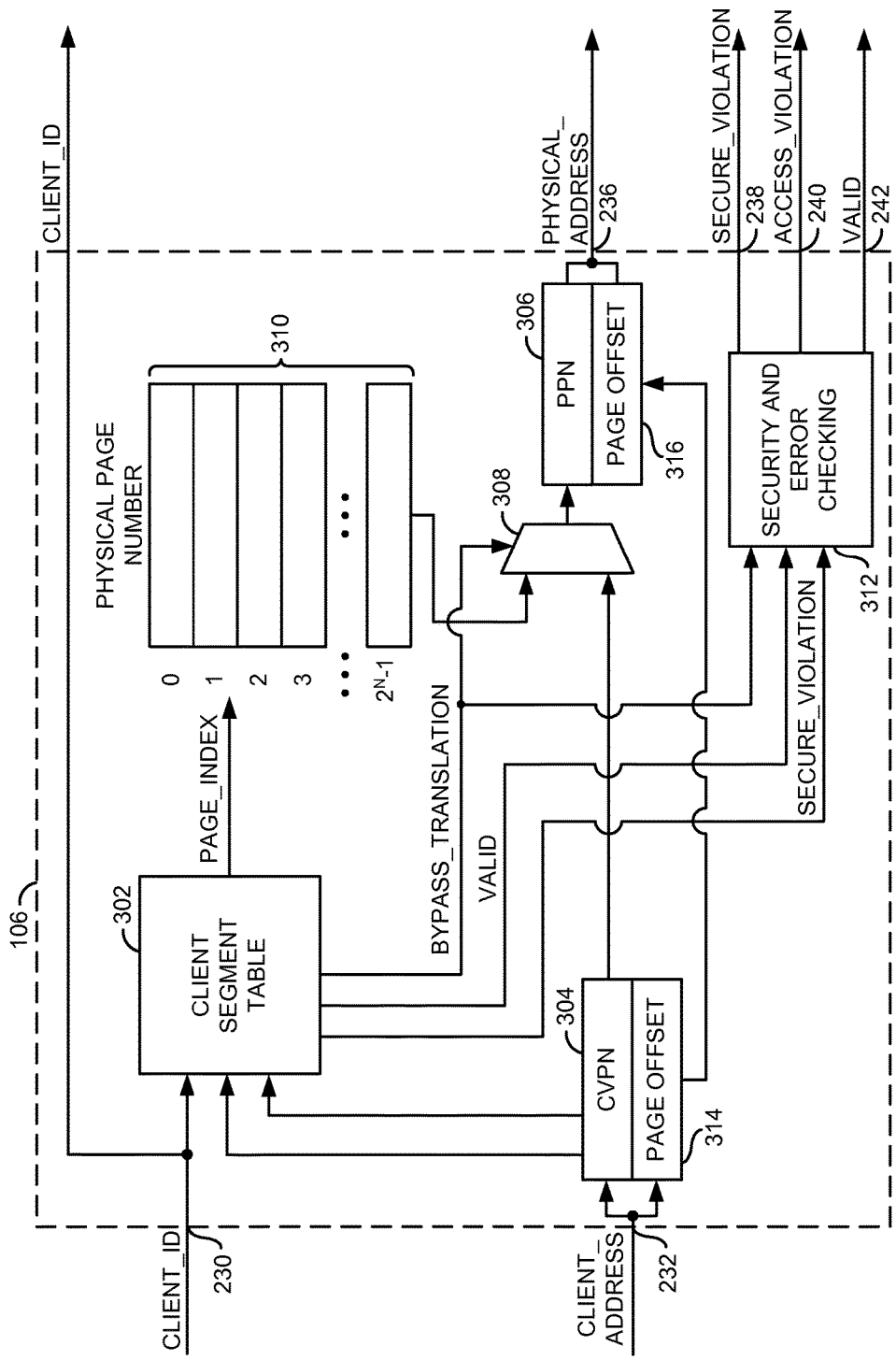
FIG. 3 is a diagram illustrating the CVPN to PPN lookup table within the secure ATT.

Referring to FIG. 3, a more detailed diagram of the ATT circuit 106 is shown illustrating the process of translating a CVPN to a PPN. The ATT circuit 106 generally comprises a block (or circuit) 302, a block (or circuit) 304, a block (or circuit) 306, a block (or circuit) 308, a block (or circuit) 310, a block (or circuit) 312, a block (or circuit) 314, and a block (or circuit) 316. The circuit 302 may be implemented as a client segment table. The circuit 304 may be configured to store a CVPN. The circuit 306 may be implemented as a block configured to store a PPN. The circuit 308 may be implemented as a selection circuit. The circuit 310 may be implemented as a page number table. The circuit 312 may be implemented as a security and error checking circuit. The circuit 314 may be implemented as a page offset. The circuit 316 may be implemented as a page offset.

When one of the clients 202a-202n accesses the memory 108, the particular client (e.g., 202a) may issue a memory request to the arbiter 204, which may then forward the request to the ATT circuit 106. The new request may arrive as a block of data including a unique identifier of the particular client 202a and a virtual address, separated into the CVPN 304 and the page offset 314 into the current page. The page offset 314 normally remains unchanged from the CVPN 304 to the PPN 306, thus the pages offset field typically remains constant. The ATT 106 may use the signal CLIENT_ID to lookup the entry of the client 202a in the client segment table 302 (to be described in more detail in connection with FIG. 4). The ATT 106 may also check for valid access. If a bypass bit is set (to be described in more detail in connection with FIG. 4), the client 202a has physical access privileges and the CVPN equals the PPN without translation or access privilege checking. If the bypass bit is not set, and the CVPN is valid, the ATT 106 uses the CVPN to index the physical page number table 310 and read the new PPN if the CVPN falls within the virtual segment of the particular client 202a.

The memory arrangement 100 may include an optional error status state to indicate to the secure host 202n that an illegal access has occurred. Error status registers, violation address registers, security errors and/or violation of client ID registers may be implemented to provide the type of invalid access, the address that accessed memory outside of defined segment, and/or the client ID that generated the invalid access respectively. The memory arrangement 100 may cover scenarios that may occur when the memory arrangement 100 records no invalid access, a single invalid access, or a list of invalid accesses. The memory arrangement 100 may replace and/or supplement other virtual memory implementations. If an error occurs during a memory access, such as an invalid CVPN, the circuit 312 may record the error in an error status register contained within the circuit 312. In addition, the error status register may record the CVPN 304, the PPN 306 and/or the ID of the client (e.g., CLIENT_ID) that caused the error. The error checking circuit 312 may also generate an error interrupt to the processor 202n. Recording errors and generating an error interrupt to the processor 202n may be used for error recovery or for debugging purposes.

An access privilege may also be specified on a per memory request basis. For example, the bypass bit may be stored as a field in the memory request. Memory requests with the bypass bit set may act as a physical client. Such a per-request control may replace or act in conjunction with the per-client bypass bit.

The PPN table 310 may be controlled by either the processor 202n or one of the clients 202a-202n. Each of the clients 202a-202n in the address translation table 106 may optionally include an enable bit in addition to a bypass bit. One or more of the clients 202a-202n may be disabled. Such a disabled one of the clients 202a-202n may still use the ATT 106, but may copy the value of the CVPN block 304 to the PPN block 306 and not provide range checking of addresses. The disabled virtual clients 202a-202n may act like physical clients. The resulting value stored in the PPN block 306 may then be recombined with the page offset 316 to form a physical address to access physical storage 210 or the registers 114.

The ATT 106 may contain a fixed number of entries. The number of entries may restrict how many mappings the clients 202a-202n may buffer without implementing a page-table lookup. The signals CLIENT_ID and CLIENT_ADDRESS may be used to determine if a potential new access to the memory 108 (or 210) is a virtual access or a physical access (e.g., using the signal BYPASS_TRANSLATION). If the new access is virtual, the signal PAGE_INDEX may determine which entry contains the VPN to PPN mapping in the ATT 106. This calculation may be done by looking up the client segment table 302. The signal PAGE_INDEX may be the address of the correct physical page number for the virtual page number of a requestor within the ATT 106. The PPN block 306 may receive the physical page number and/or the data returned by reading the signal PAGE_INDEX address within the ATT table 106. The access of the ATT table 106 may occur whether the translation is valid or not. For example, if the bypass bit is set, the entry read from the ATT 106 may be ignored. Such an operation may be determined by the following equation EQ1:

$$PPN = if\ (bypass)\ CVPN\ else\ ATT[PAGE\_INDEX]; \qquad EQ1$$

A memory address may normally comprise two components, the virtual page number (CVPN) of the client and a page offset.

The secure ATT circuit 106 may use the CVPN and the signal CLIENT_ID to calculate a page index and three status bits. The three status bits may include a bypass bit, a secure access bit and a VPN valid bit. The status bits may be used by the security and error checking circuit 312 to determine if the access is valid, if an access violation occurred and/or if a security violation. If the access is valid and passes an access check, the page index may be used to index a $2^{\wedge}(n)-1$ 1 size table to find the physical page number (PPN), where n is the number of bits in the ATT page table index. The PPN may be combined with the page offset to form a final physical memory address.

Each of the clients 202a-202n may optionally bypass the virtual-to-physical translation. This may be necessary for uncached accesses of a memory-mapped portion of the physical memory 108. When the virtual-to-physical translation is bypassed, the CVPN may be the PPN and the physical page number may be checked against the physical secure partition. The physical secure partition may be programmed separately from the virtual secure partition. Invalid accesses may be combined to generate either an access violation (e.g., segmentation fault) or a security violation.

Figure 4:
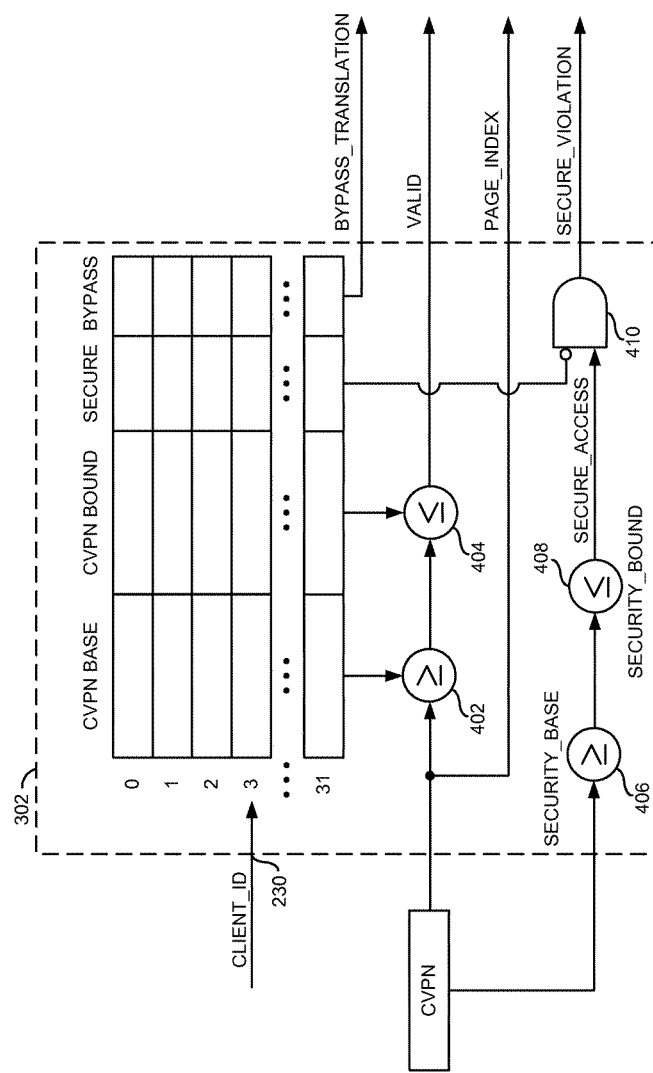
FIG. 4 is a diagram illustrating the secure client segment table programmed by the host processor.

Referring to FIG. 4, a more detailed diagram of the client segment table 302 is shown. The client segment table 302 generally comprises a CVPN base column, a CVPN bound column, a secure column, a bypass column, a block (or circuit) 402, a block (or circuit) 404, a block (or circuit) 406, a block (or circuit) 408 and a block (or circuit) 410. The circuit 402 may be implemented as a greater than logic circuit. The circuit 404 may be implemented as a "less than" logic circuit. The circuit 406 may be implemented as a "greater than" logic circuit. The circuit 408 may be implemented as a "less than" logic circuit. The circuit 410 may be implemented as a logic gate circuit. In one example, the circuit 410 may be implemented as an AND logic gate. However, other logic gates may be implemented to meet the design criteria of a particular implementation. The client segment table 302 may hold access privileges (e.g., virtual, physical, etc.) as the signal VALID and a range of each virtual segment of a particular client 202a-202n. The signal VALID is normally considered invalid if the virtual address is outside of the range of the virtual segment. If one of the clients 202a-202n does not have direct access to the ATT 106, the security processor 202n or another one of the clients 202a-202n that has access to the ATT 106 may control the client virtual memory space 102 by sending updates to the ATT 106. The processor 202n may allocate a segment of the client virtual memory space 102 for a new one of the clients 202a-202n and then determine the access privilege of each of the clients 202a-202n.

The CVPN base bits may correspond to the starting address of the segment. The CVPN bound bits may be the CVPN base plus the size of the segment. The bypass bit, which is part of the registers 116, is generally set true (e.g., ON) if a particular one of the clients 202a-202n is physical. The bypass bit is generally set false (e.g., OFF) if a particular one of the clients 202a-202n is virtual. The registers 116 may be memory mapped to a portion of the physical memory space 108. When the ATT 106 receives a translated or non-translated physical access, the physical access is not sent to the physical storage 108. Instead, the registers 114 within the ATT 106 are utilized. The processor 202n normally also has access to the same memory mapped portion to control the ATT 106 properly. Therefore, the processor 202n may then send the bypass bits to the client segment table 302 by issuing a store operation to the registers 116.

In one example, the bypass bit column may be implemented in a separate register (not shown). In another example, if none of the clients 202a-202n need direct physical access, the bypass bit may not be needed. The particular polarity of the bypass bit may be varied to meet the design criteria of a particular implementation.

The client segment table 302 may use greater than or less than logic in the blocks 402, 404, 406 or 408 to check for "in range" accesses. Alternative implementations of the client segment table 302 may include using a base address and a size to specify a particular client segment. If a particular access is invalid, the calculated physical page number may be ignored or recorded as a segmentation violation address. For example, the translation may be calculated to determine whether the access is invalid or not.

The signal CLIENT_ID may be used to index a VPN base of a particular one of the clients 202a-202n and a VPN bound register. If access for a particular one of the clients 202a-202n does not fall within the range, the CVPN is generally invalid independent of access privilege. In parallel, the CVPN generally passes a security check by the circuits 406 and 408. If the CVPN falls within the protected region, the secure bit of the particular one of the clients 202a-202n is generally marked true to pass the security check via the secure bit. All of the clients 202a-202n normally have access outside of the secure region (e.g., CVPNs outside of this region always pass the security check).

The secure client segment block 128 may check for both segmentation and security violations. Physical clients 202a-202n may set the bypass bit. Accesses to the secure region 128 may generate a security fault if the secure bit is not set. The bypass bit may indicate that the CVPN is the PPN. When this bit is set true, the virtual security access check has not occurred. However, it is still necessary for the untrusted accesses to pass the physical security check. The segment may include a per-page security and bypass bits rather than programming a VPN base and a VPN bound.

The ATT 106 may include configuration registers which may hold virtual to physical translations and security and bypass bits. One of the privileged clients 202a-202n and/or a privileged host processor 202n may update the configuration state of the ATT 106 and entries in the client segment table 302. One of the non-privileged clients 202a-202n may change the entries within the ATT 106 corresponding to a segment. However, non-privileged clients 202a-202n generally cannot write the secure or bypass bits or update the table with a mapping to the secure physical memory space 108. The secure ATT 106 may drop any update of ATT entries by non-privileged clients 202a-202n whose physical page resides in the secure memory segment 118. The system 200 may optionally include a security status register indicating which of the clients 202a-202n attempt to access and/or change secure memory but failed the security check.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
an arbiter circuit configured to generate both (a) a first address signal in a virtual memory space and (b) an identification signal by arbitrating among a plurality of clients to access a physical memory space, wherein (i) each of said clients is classified as one of either one or more privileged clients or one or more non-privileged clients, (ii) said physical memory space comprises at least one secure space, (iii) said secure space is used to protect data of said privileged clients from being accessed by said non-privileged clients, (iv) an amount of said secure space does not change during an access to said secure space and (v) said identification signal uniquely identifies said clients; and a translation circuit configured to generate a second address signal by translating a page in said virtual memory space into said physical memory space based on said first address signal and said identification signal, wherein (i) said page corresponds to a particular one of said clients that won said arbitration, (ii) said page translates into said secure space if said particular client is one of said privileged clients, (iii) said page translates outside said secure space if said particular client is one of said non-privileged clients, (iv) said secure space (a) is permitted to be accessed by said privileged clients and (b) is not permitted to be accessed by said non-privileged clients and (v) a single page translation table translates from said virtual memory space to said physical memory space.

2. The apparatus according to claim 1, wherein said non-privileged clients are prevented from controlling said translation circuit.

3. The apparatus according to claim 1, wherein said privileged clients and said non-privileged clients share said translation circuit.

4. The apparatus according to claim 1, wherein said non-privileged clients are prevented from accessing content protected by digital rights management.

5. The apparatus according to claim 1, wherein said apparatus is implemented in a real-time embedded device.

6. The apparatus according to claim 1, wherein said clients comprise (i) one or more virtual devices and (ii) one or more physical devices.

7. The apparatus according to claim 1, wherein said non-privileged clients are protected from accessing said secure space by implementing a data scrambler between said non-privileged clients and said memory space.

8. The apparatus according to claim 1, wherein said virtual memory space is implemented on a memory separate from said arbiter circuit and said translation circuit.

9. The apparatus according to claim 8, further comprising: a controller connected between said translation circuit and said memory.

10. The apparatus according to claim 8, wherein said memory comprises a Dynamic Random Access Memory.

11. An apparatus comprising:
means for generating both (a) a first address signal in a virtual memory space and (b) an identification signal by arbitrating among a plurality of clients to access a physical memory space, wherein (i) each of said clients is classified as one of either one or more privileged clients or one or more non-privileged clients, (ii) said physical memory space comprises at least one secure space, (iii) said secure space is used to protect data of said privileged clients from being accessed by said non-privileged clients, (iv) an amount of said secure space does not change during an access to said secure space and (v) said identification signal uniquely identifies said clients; and
means for generating a second address signal by translating a page in said virtual memory space into said physical memory space based on said first address signal and said identification signal, wherein (i) said page corresponds to a particular one of said clients that won said arbitration, (ii) said page translates into said secure space if said particular client is one of said privileged clients, (iii) said page translates outside said secure space if said particular client is one of said non-privileged clients, (iv) said secure space (a) is permitted to be accessed by said privileged clients and (b) is not permitted to be accessed by said non-privileged clients and (v) a single page translation table translates from said virtual memory space to said physical memory space.

12. A method for providing secure virtual access in a real-time embedded device, comprising the steps of:
generating both (a) a first address signal in a virtual memory space and (b) an identification signal by arbitrating among a plurality of clients to access a physical memory space, wherein (i) each of said clients is classified as one of either one or more privileged clients or one or more non-privileged clients, (ii) said physical memory space comprises at least one secure space, (iii) said secure space is used to protect data of said privileged clients from being accessed by said non-privileged clients, (iv) an amount of said secure space does not change during an access to said secure space and (v) said identification signal uniquely identifies said clients; and
generating a second address signal by translating a page in said virtual memory space into said physical memory space based on said first address signal and said identification signal, wherein (i) said page corresponds to a particular one of said clients that won said arbitration, (ii) said page translates into said secure space if said particular client is one of said privileged clients, (iii) said page translates outside said secure space if said particular client is one of said non-privileged clients, (iv) said secure space (a) is permitted to be accessed by said privileged clients and (b) is not permitted to be accessed by said non-privileged clients and (v) a single page translation table translates from said virtual memory space to said physical memory space.

13. The apparatus according to claim 1, wherein said translation circuit checks whether said page of said physical memory space is within said secure space prior to permitting said privileged clients to update said page.

14. The apparatus according to claim 1, wherein said translation circuit checks whether said physical memory space is within said secure space prior to dropping updates from said non-privileged clients.

15. The apparatus according to claim 1, wherein if one of said non-privileged clients attempts an update to said secure space, said update is dropped.

16. The apparatus according to claim 1, wherein all of said non-privileged clients operate in a common virtual memory space.

* * * * *